United States Patent
McGrew et al.

(10) Patent No.: US 8,356,177 B2
(45) Date of Patent: Jan. 15, 2013

(54) KEY TRANSPORT IN AUTHENTICATION OR CRYPTOGRAPHY

(75) Inventors: David A. McGrew, Poolesville, MD (US); Brian E. Weis, San Jose, CA (US); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/604,221

(22) Filed: Oct. 22, 2009

(65) Prior Publication Data

US 2010/0169645 A1 Jul. 1, 2010

Related U.S. Application Data

(60) Provisional application No. 61/141,375, filed on Dec. 30, 2008.

(51) Int. Cl.
*H04L 9/00* (2006.01)
(52) U.S. Cl. .......................... 713/168; 380/284
(58) Field of Classification Search .................. 713/168, 713/164, 170, 176, 179; 380/28, 44, 268, 380/284
See application file for complete search history.

(56) References Cited

U.S. PATENT DOCUMENTS

| | | | |
|---|---|---|---|
| 2005/0157871 A1* | 7/2005 | Komano et al. | 380/28 |
| 2006/0262933 A1* | 11/2006 | Furukawa | 380/281 |
| 2007/0079118 A1* | 4/2007 | Chmora et al. | 713/163 |
| 2010/0027783 A1* | 2/2010 | Yup | 380/44 |
| 2011/0191588 A1* | 8/2011 | Rogaway | 713/170 |
| 2011/0246766 A1* | 10/2011 | Orsini et al. | 713/160 |

OTHER PUBLICATIONS

McGrew, D. "An Interface and Algorithms for Authenticated Encryption" Cisco Systems, Inc. Jan. 2008, pp. 1-22.*

* cited by examiner

*Primary Examiner* — Beemnet Dada
(74) *Attorney, Agent, or Firm* — Hickman Palermo Truong Becker Bingham Wong LLP

(57) ABSTRACT

A computer system for authenticating, encrypting, and transmitting a secret communication, where the encryption key is transmitted along with the encrypted message, is disclosed. In an embodiment, a first transmitting processor encrypts a plaintext message to a ciphertext message using a data key, encrypts the data key using a key encrypting key, and sends a communication comprising the encrypted data key and the ciphertext message. A second receiving processor receives the communication and then decrypts the encrypted data key using the key encrypting key and decrypts the ciphertext message using the data key to recover the plaintext message.

30 Claims, 6 Drawing Sheets

AEAD-DC Packet

KEY TRANSPORT IN AUTHENTICATION OR CRYPTOGRAPHY

CROSS-REFERENCE TO RELATED APPLICATIONS; PRIORITY CLAIM

This application claims the benefit under 35 U.S.C. §119(e) of Provisional Application 61/141,375, filed Dec. 30, 2008, the entire contents of which are hereby incorporated by reference for all purposes as if fully set forth herein.

TECHNICAL FIELD

The present disclosure generally relates to network security. The disclosure relates more specifically to approaches for transporting keys in cryptographic data processing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In many applications of encryption and/or authentication, the need to store cryptographic keys, and to fetch the appropriate key to process a particular message, is a performance bottleneck. In particular, when a network device receives an encrypted and/or authenticated message, it cannot process that message until it fetches the appropriate key from memory.

Authenticated encryption refers to a cryptographic transform which, in addition to providing confidentiality for the plaintext that is encrypted, provides a way to check its integrity and authenticity. For example, the combination of AES-CBC and HMAC-SHA1 are often combined to create an authenticated encryption method. Alternately, a dedicated Authenticated Encryption with Associated Data (AEAD) algorithm, such as Advanced Encryption Standard Galois/Counter Mode (AES-GCM) can be used.

AEAD adds the ability to check the integrity and authenticity of some Associated Data (AD), also called "additional authenticated data", which is not encrypted. For example, when AEAD is used to protect packets in a network protocol, the headers (which typically need to be left unencrypted) are considered associated data and comprise the AD input. When AEAD is used in Encapsulating Security Payload (ESP), the ESP Security Parameters Index (SPI) and Sequence Number fields are input as AD.

In general, an AEAD operation takes as input a secret key K, an associated data element A, a nonce N, and a plaintext message P, and returns a ciphertext message C. The decryption operation takes as input the secret key K, the associated data element A, the nonce N, and the ciphertext message C, and returns the plaintext message P, or returns an indication that there was an authentication failure. The nonce is selected by the encrypter, may be distinct for each distinct packet, is sent with the message, and is used by the decrypter. In many security protocols, such as AES-GCM-ESP, the nonce is carried in an Initialization Vector (IV). Examplary AEAD operations may be written symbolically as: encrypt: K, A, N, P→C; decrypt: K, A, N, C→P or FAIL. An example of an AEAD system is described in IETF RFC 5116, "An Interface and Algorithms for Authenticated Encryption."

When AEAD is used, the encrypting device uses certain unencrypted information (for example, the IV or the nonce) to encrypt the packet. This information is included in the packet by the encrypting device, so that the decrypting device has the all of the data that it needs to decrypt the packet. The decrypting device needs the same data in order to properly decrypt the packet.

DETAILED DESCRIPTION

Figure 1:
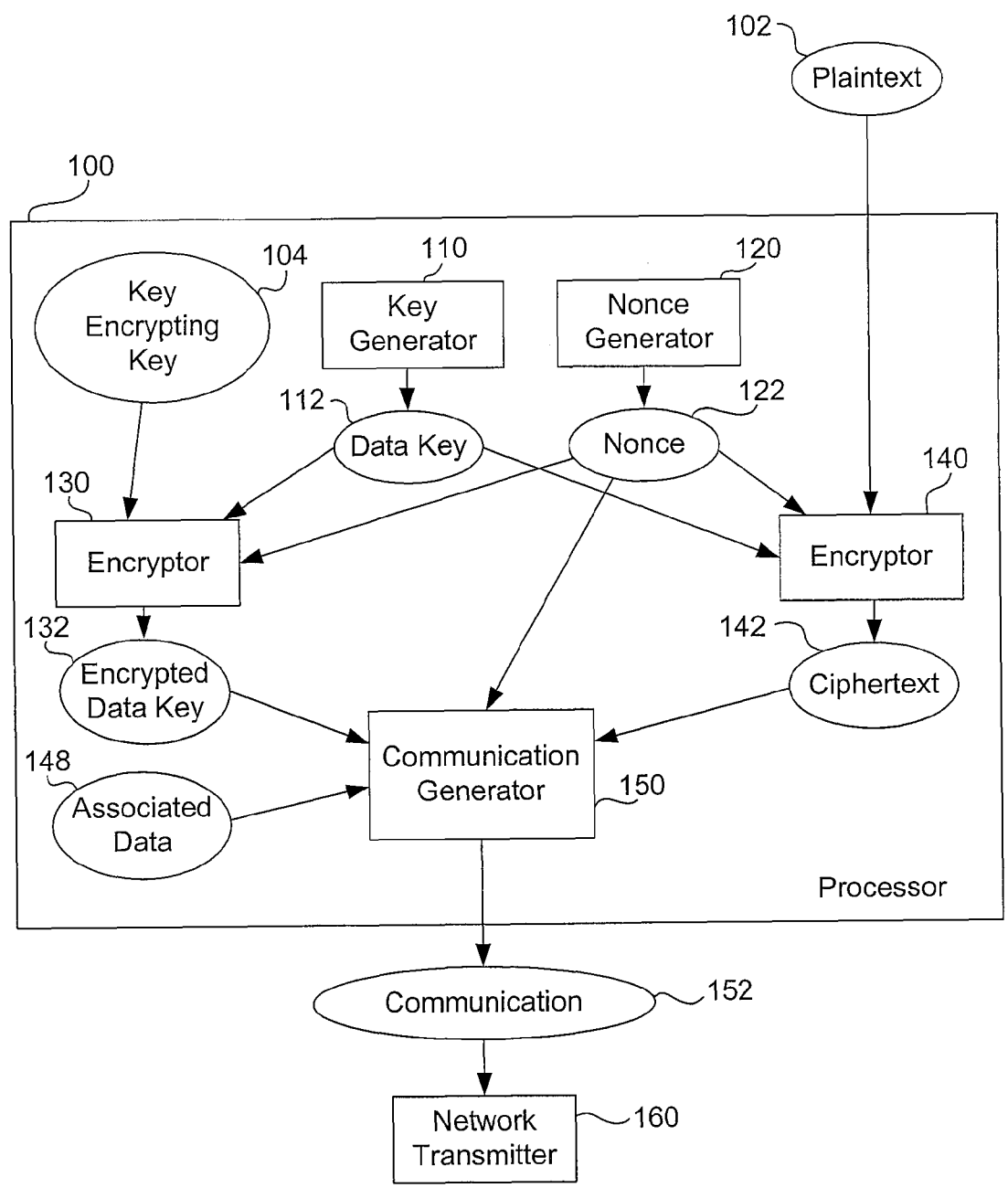
FIG. 1 illustrates a processor designed to convert a plaintext message to an encrypted communication that can be transmitted over a network.

A method and apparatus for key transport in authentication and cryptography are described. In the following description, for the purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Authenticated Encryption with Associated Data and Key Transport (AEAD-KT)
   3.1 Process of Encrypting, Authenticating, and Transmitting a Secret Message
   3.2 Process of Receiving, Decrypting, and Verifying the Authenticity of a Secret Message
   3.3 Communication Structure
   3.4 Formal Description of an Example Embodiment
      3.4.1 AEAD with Key Transport
         3.4.1.1 Encryption
         3.4.1.2 Decryption
      3.4.2 Decryption Context: Example Embodiments
         3.4.2.1 Advanced Encryption Standard 128 Bit Electronic Codebook (AES_128_ECB)
         3.4.2.2 Advanced Encryption Standard 256 Bit Key Wrap (AES_256_KW)
      3.4.3 Key Management
         3.4.3.1 Changing Key Encrypting Keys
         3.4.3.2 Internet Key Exchange (IKE)
         3.4.3.3 Group Domain of Interpretation (GDOI)
         3.4.3.4 Transport Layer Security (TLS)
      3.4.4 AEAD-KT Processes
         3.4.4.1 Authenticated Encryption with Associated Data and Key Transport under Authenticated Encryption Standard 128 Bit Galois/Counter Mode (AEAD_KT_AES_128_GCM)

3.4.4.2 Authenticated Encryption with Associated Data and Key Transport under Authenticated Encryption Standard 256 Bit Galois/Counter Mode (AEAD_KT_AES_256_GCM)

3.4.5 Using AEAD-KT in Encapsulating Security Payload (ESP)

3.4.6 Using AEAD-KT in Transport Layer Security (TLS)

3.4.7 Design Options 3.4.8 Security Considerations 4.0 Implementation Mechanisms—Hardware Overview 5.0 Extensions and Alternatives 1.0 General Overview In an embodiment, a computer-implemented method comprises selecting a plaintext message to be authenticated cryptographically protected for integrity and confidentiality; selecting an associated data to be authenticated and transmitted, but not encrypted; creating and storing a data key to encrypt the plaintext message in a uniformly random or pseudorandom manner; creating and storing a nonce; creating and storing a ciphertext message, wherein the ciphertext message is at least as long as the plaintext message and is derived from at least the plaintext message, the data key, and the nonce; creating and storing an encrypted data key, wherein the encrypted data key is derived from at least the data key, a key encrypting key; generating a communication comprising at least the encrypted data key, the ciphertext message, and the associated data; wherein each of the above steps is performed by one or more processors.

In an embodiment the nonce is either unique for any particular value of the data key or zero length. In other embodiments, such as when AES-CBC is used, the initialization vector may serve as a non-unique nonce.

In one embodiment, a first processor functions to authenticate, encrypt, and transmit a communication. The processor contains a representation of a plaintext message to be authenticated, encrypted, and transmitted and associated data to be authenticated and transmitted, but not encrypted. The plaintext message and the associated data have many uses. For example, the plaintext message might be a credit card number, and the associated data might be network routing information. To encrypt the plaintext message, a data key is generated in a random or pseudorandom manner. In one embodiment, a nonce is also generated, but a nonce is not required. If present, the nonce may be unique for any particular value of the data key. The processor has logic to encrypt the plaintext message into a ciphertext message. The encryption function is derived from the data key and the nonce. Also, the data key is encrypted into an encrypted data key. The encryption function for the data key is determined from a key encrypting key and the nonce. The key encrypting key is a constant key used to encrypt many communication keys, and may be stored on the processor or in another location.

In one embodiment, the key encrypting key is stored on the all of the processors that are either transmitting or receiving data and protected under maximal security. The processor has logic to generate a communication comprising at least the encrypted data key, the ciphertext message, and the associated data. In one embodiment, the nonce is also transmitted in the communication. This communication is transmitted through a network to at least one second processor.

In an embodiment, a second processor functions to receive, decrypt, and verify the authenticity of the communication. In one embodiment, there is only one second processor; alternatively, more than one second processor decrypts the communication. The second processor either has logic to represent the key encrypting key or has some other access to this key. In an embodiment, the key encrypting key is stored on the processor under maximum security. The communication is received through a network transmitter. It is then parsed into at least an encrypted data key, a ciphertext message, and an associated data. In one embodiment, the nonce is also derived from the communication. Alternatively, the second processor might regenerate the nonce in some other manner, or a nonce might not be used at all.

The second processor has logic configured to regenerate a data key. The decryption function is determined from the key encrypting key and the nonce. This function is then applied to the encrypted data key to determine the data key. If all of the key encrypting key, the encrypted data key, and the other data are authentic, the function returns the authentic data key. However, if at least one of the key encrypting key, the encrypted data key, and the nonce is not authentic, the function should return a failure indication. After the data key is generated, the processor can decrypt the ciphertext. The decryption function is determined from the data key and the nonce and then applied to the ciphertext to reveal the plaintext. If all of the data key, the nonce, and the ciphertext are authentic, the function should reveal the authentic plaintext. However, if at least one of the data key, the nonce, and the ciphertext is not authentic, the function should return a failure indication.

Some embodiments of the invention use a network that allows for communication between the first processor and the second processor. In one embodiment, the plaintext message is decipherable from the ciphertext message only by the second processors, and possibly also by the first processors. In yet another embodiment, the plaintext message and the associated data are verifiable to have originated from the first processor. Additionally or alternatively, the first processor and second processor may be the same processor, or may comprise different cores within a single processor.

In other embodiments, the invention encompasses a computer-implemented method configured to carry out the foregoing functions and a computer-readable storage medium storing instructions which when executed cause performing the functions.

2.0 Structural and Functional Overview

In an embodiment, an encrypting device provides additional data to the decrypting device, to overcome the performance bottleneck mentioned above. In an embodiment, an encrypting device provides other cryptographic data to the decrypting device. In an embodiment, the Associated Data or the Ciphertext portion of an AEAD method includes an encrypted key, and optionally related information, in either of the portions. The key to be included is the same key as is used by the AEAD process. Therefore, the encrypted key is immediately available to one or more decrypting devices.

A decrypter can avoid storing multiple decryption keys, by instead storing a single key-encrypting-key (KEK) that the decrypter can use to decrypt the keys in the associated data (AD) or ciphertext (C) field, at the time when they are needed. In various embodiments, a pair-wise or group security association may be used.

In an embodiment, authorized intermediate systems (e.g., firewalls, NAT devices, and WAAS devices) can also decrypt the packets to inspect the packet and/or re-encrypt a modified packet.

In an embodiment, an AEAD method incorporates a decryption context field that is defined by the decryption device, and which is included by the encrypting processor in all of the messages that it sends. "AEAD with decryption context", or AEAD-DC, is defined as follows. The encryption operation is: encrypt-DC(K,A,N,P,D)=D∥encrypt(K,A,P)= D∥C=C', where the symbol ∥ represents the concatenation operation, and the symbol C represents the ciphertext output of the encrypt( ) function. The symbol C' represents the ciphertext output of the encrypt-DC function, which incorporates the decryption context.

Thus Decryption Context field D is concatenated with the ciphertext to form the encrypt-DC ciphertext. The decryption context field comprises the encrypted key, and possibly also some extra information. The extra information could include, for example, instructions regarding how to decrypt and process the encrypted key. The decryption operation can be defined as follows, where the function extract(D) returns the secret key K, given the decryption context: decrypt-DC(A,C, N,D)=decrypt(extract(D),A,C) where the values C and D are found by parsing the input C'.

The encrypted key can be passed to the AEAD encrypting processor in ciphertext form, in which case the encrypting processor merely includes that value, verbatim, in the appropriate AEAD field. The encrypted key can be generated by the receiver, or by a key management system operating on behalf of multiple receivers. The key management system, which is responsible for the key-encryption-key, can operate independent of another key management system used to establish the AEAD key.

In one embodiment, the approach herein can be used with regular encryption methods, such as AES-CBC, or authentication methods, such as HMAC-SHA1. The decryption context may hold a decryption key for each receiver, for each algorithm; if separate algorithms are used for encryption and authentication, then two keys are used. For this reason, in an embodiment, the method is used with AEAD algorithms such as AES-CCM (Advanced Encryption Standard, Counter with Cipher Block Chaining Message Authentication Code) and AES-GCM (Galois/Counter Mode), for which only one key is used.

The AEAD-DC method can be applied to IPsec Encapsulating Security Payload (ESP) as follows. An ESP Transform describes the decryption context (DC) at the outset of the ciphertext field, following the initialization vector (IV) and optionally a sequence number but preceding the actual ciphertext (also shown below). Both the IV and the DC are part of the ESP Payload Data field. The ESP Payload Data field has substructure that depends on the choice of encryption algorithm and mode.

Figure 7:
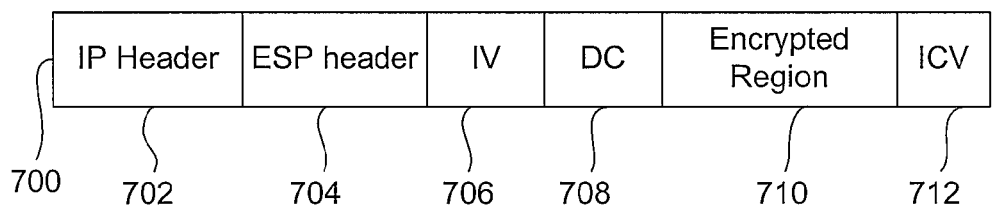
FIG. 7 illustrates an example AEAD-DC packet.

FIG. 7 illustrates an example AEAD-DC packet 700 that comprises an Internet Protocol (IP) Header 702, an Encapsulating Security Payload (ESP) Header 704, an Initialization Vector (IV) 706, a DC 708, an encrypted region 710, and an Integrity Check Value (ICV) 712.

In an embodiment, computer system implementing AEAD-DC can feature the following attributes.

1. A key management method creates a key used to encrypt the DC field. In an embodiment, Electronic Codebook (ECB) encryption of Advanced Encryption Standard 128 bit (AES-128) keys is used to encrypt the DC and the DC includes a single AES-128 key. However, other methods may be used if the DC is larger or contains longer keys.

2. The management method distributes the DC encryption key to the sender, receiver(s), and authorized intermediate systems that require it. The sender can be sent the DC in ciphertext form. To use this system with the Internet Key Exchange (IKE), the present approach provides a payload that one peer can give to another, which holds the DC field. This payload is sent with a Security Association (SA) to indicate that the DC should be included in all packets sent under that SA. Alternative methods are possible, including deriving new keys from the IKE SKEYID field, which comprises is a string derived from secret material known only to the active players in the exchange. Such alternatives may require enhancements to IKE algorithm. In a group application, a group key management method such as Group Domain of Interpretation (GDOI) could deliver the DC encryption key to authorized group members.

3. The sender of a transmitted communication packet using AEAD-DC provides the encryption engine the IV and optional Sequence Number as part of the associated data. If the transmitted packet comprises the DC encryption key, then the transmitted packet can also encrypt the session key (and possibly other information) with the DC encryption key and contain the results. If the packet does not have the DC encryption key, then it should have the DC in its ciphertext form, which it includes in the ciphertext portion of the transmitted communication.

4. The receiver of a packet using AEAD-DC first extracts the session key from packet using the DC encryption key that it was given by key management. The receiver then provides the decryption engine with the associated data A and the extracted session key in order to recover the plaintext message P from the ciphertext message C.

In one embodiment, the AEAD method of authenticated encryption is enhanced to pass encrypted associated data, which includes a decryption key and possibly other secret content. This method allows authorized receiving devices to decrypt the packet and operate on it, while avoiding the need to store multiple session keys. As a result, the method avoids the need to fetch those keys, and thus avoids the processing stall due to the latency of the fetch operation.

In one embodiment, the method herein enables a decrypting processor to avoid storing and fetching multiple session keys, thus avoiding processing stall due to the latency of that fetch operation, and allowing a decryption processor to perform better and to be scaled to support larger numbers of sessions.

In another embodiment, the method herein enables authorized inspection and modification of messages by middlebox processors, which are allowed access to the key-encrypting-key, to decrypt the DC. Otherwise the middlebox processors would be obligated to either drop the packets or pass them without action, depending on security policy. The method herein thus provides scalability to such middleboxes. In this context, a middlebox is a network device that performs functions other than just data forwarding; examples include firewalls and network address translators.

In yet another embodiment, the method herein allows one or more authorized receivers to decrypt a packet without having previously received or stored the key. Thus, the approaches herein allow for highly scalable IPsec hardware.

The method herein can work with any existing key management system, such as Internet Key Exchange (IKE) or Group Domain of Interpretation (GDOI). An embodiment can be configured to operate in the current IPsec architecture and ESP definition. Other embodiments may use new protocol encapsulations. An embodiment can be used in any of the protocols that have adopted AEAD, including TLS 1.2, Secure RTP, and SSH. IEEE Std. 802.1AE also could use this method. An embodiment of the method may used as part of the Ganita encryption engine for Encryption Security Protocol (ESP) at Layer 3, commercially available from Cisco Systems, Inc., San Jose, Calif. In another embodiment, the Cavium Octeon and some Nitrox crypto Application-Specific Integrated Circuits (ASICs) may be used to form crypto accelerators that make use of the approaches herein.

In an embodiment, to avoid having the same master key everywhere, one or more zones are defined and the key is the same in each different zone. The transmitted ciphertext message is then re-encrypted at the edge of a zone when it reaches another zone that uses a different master key. In an embodiment, mechanisms for synchronizing the key may be provided.

For convenience, certain embodiments are described herein in terms of process steps or algorithm steps. In various embodiments, the process steps or algorithm steps described herein may be implemented in one or more computer programs, or in program instructions embodied in firmware, or in hardware logic. For example, an embodiment may comprise an application-specific integrated circuit (ASIC) comprising logic gates or other electronic circuit structure which when powered performs the process steps described herein. An embodiment may comprise a cryptographic hardware processor or a special-purpose computer that includes a firmware or hardware module, block or other circuit element(s) comprising gates or other logic that implement the process steps described herein.

One embodiment of the invention a special-purpose computer in the form of a general-purpose data processing system coupled to a memory device or data storage device that stores program instructions or software modules that implement the process steps, in which the general-purpose data processing system is transformed into a special-purpose computer by loading and executing the program instructions or software modules. Another embodiment comprises a special-purpose computer having a logical unit or functional block of circuit logic or program instructions corresponding to one or more of the process steps herein.

Many network services rely on the inspection and/or modification of traffic passing through the network, such as IDS/IPS, firewalling, NAT/PAT, WAAS, header compression, transport acceleration for satellite links, and QoS and QoS marking, and any services that make use of deep packet inspection. These services cannot operate on encrypted traffic. Numerous benefits arise from a method that enables a device that is originating encrypting traffic to share the encryption key, in a secure manner, with trusted network devices along the path. By sharing the key with selected trusted network devices on the path, the network and all of its services can be kept working even in the presence of encryption. In this description, the trusted network devices are termed Trusted Intermediaries (TIs).

In an embodiment, Authenticated Encryption with Associated Data and Key Transport (AEAD-KT) provides a secure method of sharing encryption keys with the devices along a path. To use AEAD-KT for this purpose, one or more Key Encrypting Keys (KEKs) are given to the TIs, via a secure protocol. In general, there may be multiple TIs along the path that an encrypted connection takes through the network. In that case, either the TIs share a single KEK, or the AEAD-KT DC contains multiple encrypted keys, each encrypted with a different KEK, so that each of the TIs on the path knows at least one of the KEKs.

When an encrypted connection using AEAD-KT is established, the DC is computed. In one embodiment, at least one of the devices establishes an encrypted connection using AEAD-KT to share a KEK with the TIs. The device can then compute the DC directly, as soon as it knows the AEAD key for an encrypted connection. If there are multiple TIs on the path of the connection, then multiple KEKs are used. Alternatively, only a single KEK could be used.

In another embodiment, at least one of the devices provides the AEAD key to a system that generates the correct DC, and returns that value to the device. The communication between the device and this DC generation service is encrypted and authenticated. Thus, the service provides the device with "permission" to transit in the network, in the sense that the service controls which devices can create encrypted sessions that can successfully transit the network. In one embodiment, the DC-generation service provides DCs selectively, based on one or more rules. The rules may be pre-determined or changeable when necessary.

In an embodiment, there are many KEKs and each KEK is known by at least one TI. Each path through the network is associated with the set of KEKs that are associated with the TIs along that particular path. Given a set of TIs, KEKs are assigned such that each path through the network is associated with a small number of KEKs.

In another embodiment, at least one TI that is associated with two KEKs is configured to translate an AEAD-KT message from using one KEK to using another KEK. In one embodiment, the AEAD ciphertext does not change, except for the authentication-check part. In another embodiment, a change in the AEAD ciphertext occurs as a result of the translation.

Figure 3:
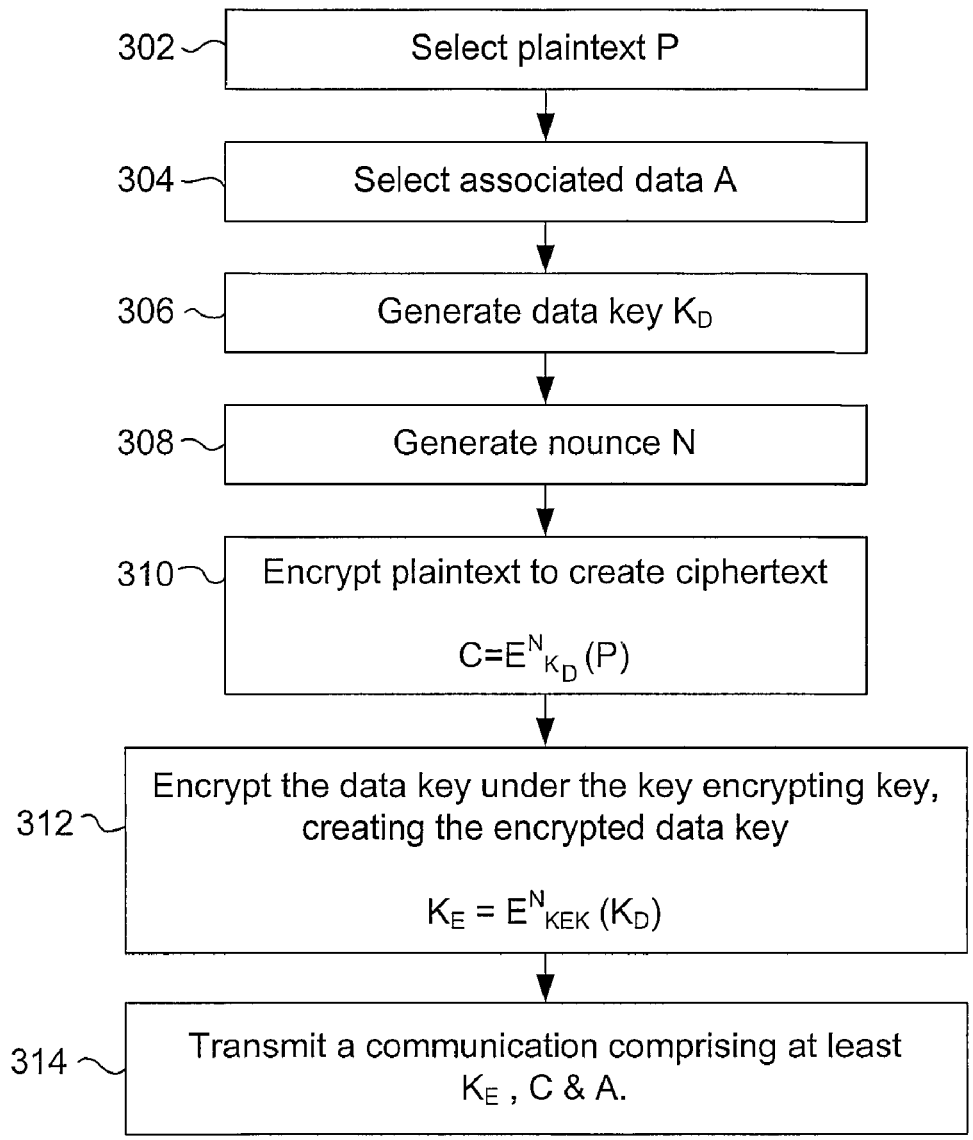
FIG. 3 illustrates a method for encrypting a plaintext message to a communication that can be secretly transmitted over a network.

FIG. 3 illustrates a flowchart for the operation of a first processor that encrypts, authenticates, and transmits a secret message in one embodiment.

At step 302, the processor selects a plaintext message P to be encrypted, authenticated, and transmitted.

At step 304, an associated data A is selected to be authenticated and transmitted, but not encrypted. In one embodiment, the associated data comprises routing information to be read by the network.

At step 306, the processor generates a data key KD, which will be used to encrypt the plaintext message P.

At step 308, the processor generates a nonce N. Preferably, N is either zero-length or unique for each value of KD. In one embodiment, no nonce is used, and the encryption is based only on the keys.

At step 310, the plaintext message P is encrypted to create a ciphertext message C. The encryption function is derived from the data key KD and the nonce N.

At step 312, the data key KD is encrypted producing the encrypted data key KE. The encryption function is derived from a key encrypting key KEK and the nonce N. The key encrypting key KEK is stored either on the processor or on the network, preferably under maximum security. KEK should only be accessible to those processors that are authorized either to transmit or to receive the communication to protect the secrecy of the message.

At step 314, the processor transmits a communication comprising at least the encrypted data key KE, the ciphertext message C, and the associated data A over a network to at least one other processor. In one embodiment, the nonce N is also transmitted in the communication.

Figure 4:
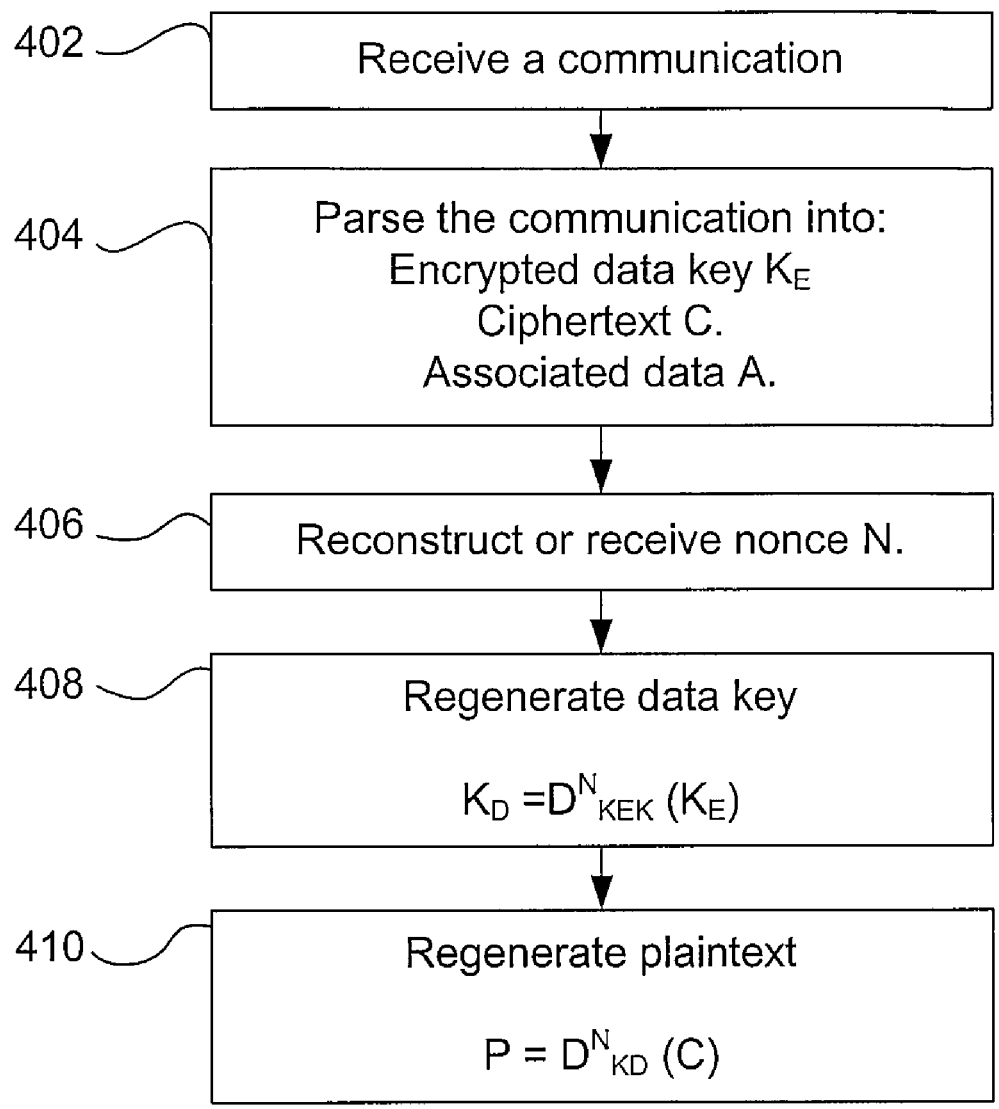
FIG. 4 illustrates a method for decrypting a communication to recover the secret plaintext message.

FIG. 4 illustrates operation of a second processor that receives, decrypts, and verifies the authenticity of the communication. In some embodiments, the process of FIG. 4 may be performed by the same processor as the process of FIG. 3.

At step 402 the processor receives a communication through the network.

At step 404 the communication is parsed into an encrypted data key KE, a ciphertext message C, and an associated data A.

At step 406, the processor reconstructs or receives the nonce N. In one embodiment, no nonce is used and this step is skipped.

At step 408, the processor attempts to regenerate the data key. The decryption function D is generated from the key encrypting key KEK and the nonce N and applied to the encrypted data key KE. As with the transmitting processor, the receiving processor can access the KEK either by storing KEK locally or over a network. In an embodiment, the KEK is stored under maximum security. The KEK may be accessible only to processors that are authorized to transmit or receive secret messages. The decryption function returns the authentic data key KD only if all of the key encrypting key KEK, the encrypted data key KE, and the nonce N are authentic. If at least one is not authentic, then the decryption function returns a failure signal. In one embodiment, a user of the processor is alerted to the error.

At step 410, the processor attempts to regenerate the plaintext message P. The decryption function D is generated from the data key KD and the nonce N and applied to the ciphertext message C. The decryption function returns the authentic plaintext message P only if all of the data key KD, the ciphertext message C, and the nonce N are authentic. If at least one is not authentic, the decryption function returns a failure indication. In one embodiment, a user of the processor is alerted to the error.

3.0 Authenticated Encryption with Associated Data and Key Transport (AEAD-KT)

3.1 Process of Encrypting, Authenticating, and Transmitting a Secret Message

FIG. 1 illustrates a processor 100 configured to transmit a secret communication in an authenticated encryption with associated data and key transport (AEAD-KT) algorithm. The processor 100 receives as input a plaintext message 102. Processor 100 further comprises logic to represent or receive a key encrypting key 104. In an alternative embodiment, the key encrypting key may be stored externally and accessible to the processor 100 through a network. Preferably, the key encrypting key is stored under maximum security.

The processor 100 also has a key generator 110, which is configured to generate data a key 112, and a nonce generator 120, which is configured to generate a nonce 122. In one embodiment, the nonce generator 120 and nonce 122 are omitted. In another embodiment, the nonce 122 is unique for any particular value of the data key 112.

Processor 100 further comprises two encryptors 130, 140. Encryptor 130 receives as input the key encrypting key 104, the data key 112, and optionally the nonce 122 and produces as output the encrypted data key 132. Receiving the nonce is optional because in some embodiments it is beneficial for the encrypted data key output to be static, for example, when one processor formats the frame including the encrypted data field, and another processor only performs encryption using the data key. Encryptor 140 receives as input the data key 112, the plaintext message 102, and the nonce 122, and produces as output the ciphertext message 142. The ciphertext message 142 is at least as long as the plaintext message 102.

The encrypted data key 132, the ciphertext message 142, and the associated data 148, are provided as input to a communication generator 150. The communication generator 150 produces as output a communication 152, which includes an authenticated message comprising a representation of at least the encrypted data key, the ciphertext message, and the associated data. The associated data 148 is authenticated, but not encrypted. In one embodiment, the associated data 148 contains routing information for the network. Communication 152 is transmitted through a network transmitter 160 to at least one other processor that can read the communication.

Figure 2:
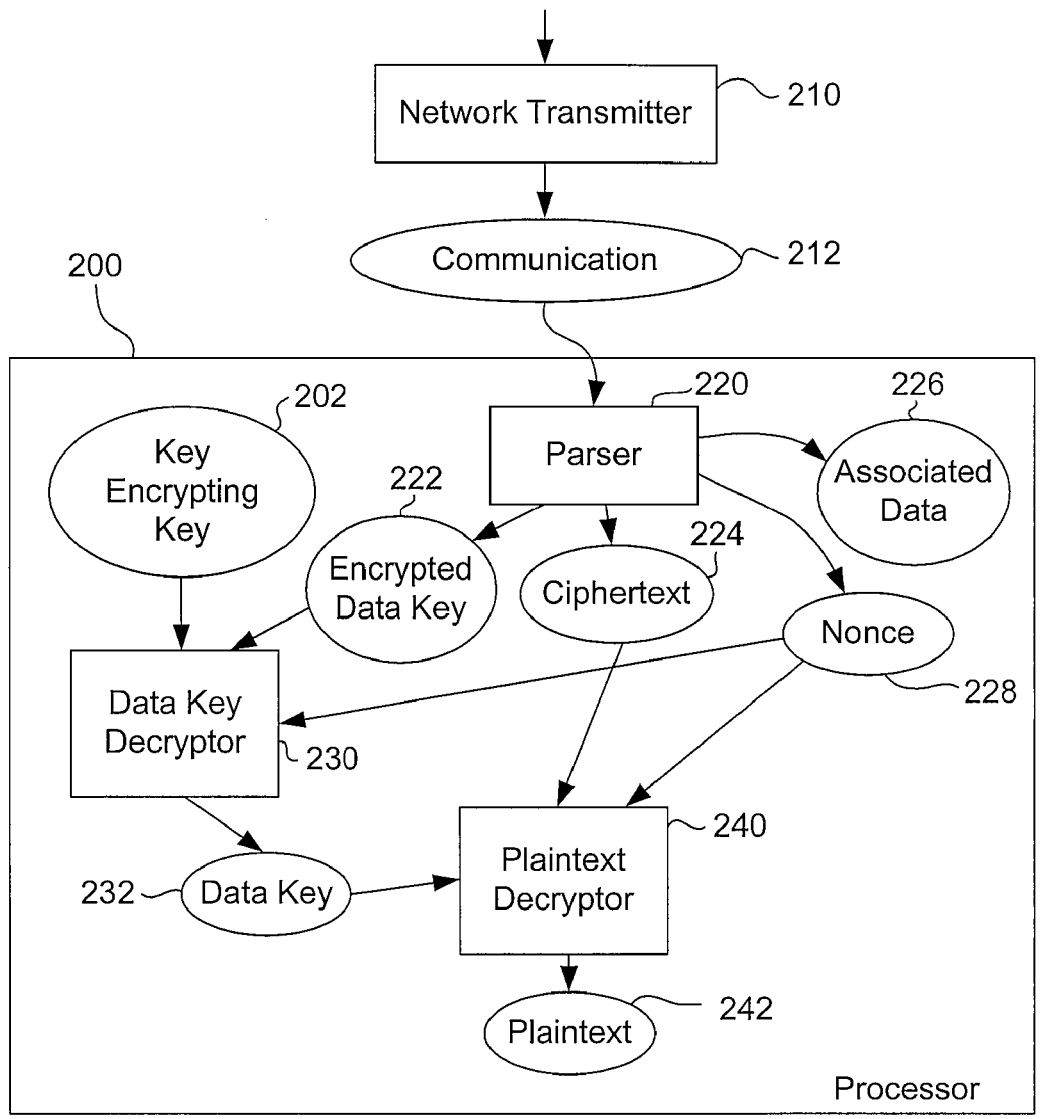
FIG. 2 illustrates a processor that can read a communication transmitted over a network and decrypt the communication to recover the secret plaintext message.

3.2 Process of Receiving, Decrypting, and Verifying the Authenticity of a Secret Message FIG. 2 illustrates a processor 200 that is adapted to receive and read a secret communication using an authenticated encryption with associated data and key transport (AEAD-KT) process.

A network transmitter 210 receives a communication 212, which is inputted to the processor 200. The processor 200 has logic configured for representing the key encrypting key (KEK) 202. Alternatively, the key encrypting key (KEK) 202 is stored externally and sent to the processor 200 through a network. Preferably, the key encrypting key 202 is stored under maximum security.

The communication 212 is inputted to a parser 220, which separates the communication into at least the encrypted data key 222, the ciphertext message 224, and the associated data 226. In one embodiment, the parser 220 also reconstructs the nonce 228 from the communication. Alternatively, a nonce is not used, or the nonce is regenerated through other logic in the processor 200.

To decrypt the data key, the key encrypting key 202, the encrypted data key 222, and the nonce 228 are inputted to a data key decryptor 230, which outputs the data key 232. If the key encrypting key 202, the encrypted data key 222, and the nonce 228 are all authentic, the data key decryptor 230 produces the authentic data key 232. If at least one of the key encrypting key 202, the encrypted data key 222, and the nonce 228 is not authentic, the data key decryptor outputs a failure indication in the field for data key 232. In one embodiment, a user is alerted to the error.

The data key 232, ciphertext message 224, and nonce 228 are then inputted to the plaintext decryptor 240, which outputs the plaintext message 242. If the data key 232, the ciphertext message 224, and the nonce 228 are all authentic, the plaintext decryptor 240 should produce the authentic plaintext message 242. If at least one of the data key 232, the ciphertext message 224, and the nonce 228 is not authentic, the plaintext decryptor outputs a failure indication in the plaintext message 242 field. In one embodiment, a user is alerted to the error.

3.3 Communication Structure

Figure 6:
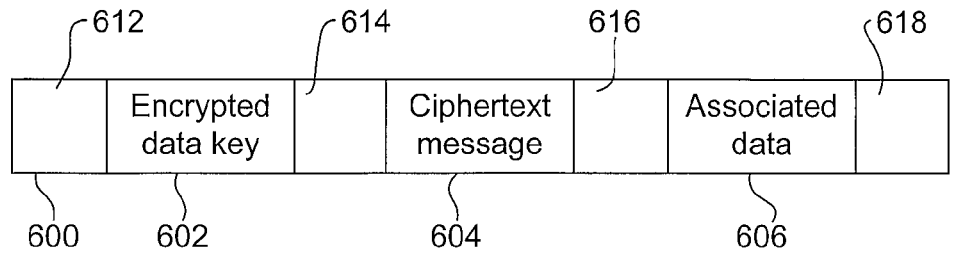
FIG. 6 illustrates a structure of a communication, comprising an encrypted data key, a ciphertext message, and associated data.

FIG. 6 illustrates a communication 600 transmitted through a network in accordance with an embodiment. The communication 600 may comprise a packet, datagram, or other message and includes a representation of the encrypted data key 602, the ciphertext message 604, and the associated data 606. Other information or headers might be stored in the communication at positions 612, 614, 616, and 618. Alternatively, positions 612, 614, 616, and 618 are null or empty. In one embodiment, the nonce is also transmitted in the communication 600.

3.4 Formal Description of Example Embodiment 3.4.1 AEAD with Key Transport

In one embodiment, an AEAD algorithm supports key transport and is denoted as AEAD-KT.

3.4.1.1 Encryption

An AEAD encryption algorithm as defined by RFC 5116 takes as input four octet strings: a secret key K, a plaintext P, associated data A, and a nonce N, and an authenticated ciphertext value is provided as output. The data in the plaintext are encrypted and authenticated, and the associated data are authenticated, but not encrypted. In an embodiment, an AEAD-KT encryption algorithm takes an additional input, the decryption context D; this value is a string of D_LEN octets, where D_LEN is a fixed parameter for any fixed value of the secret key.

The AEAD-KT encryption process may be described in terms of an AEAD algorithm. The AEAD-KT encryption process operates as follows in an embodiment.

1. The values K, P, A, and N are taken as inputs from the AEAD process. The value D is taken as input from either the same or another source.

2. The AEAD key K, plaintext P, and nonce N are used as the AEAD-KT key, plaintext, and nonce, respectively.

3. The AEAD-KT associated data is formed by appending the decryption context D to the AEAD associated data A.

4. The AEAD encryption operation is performed, resulting in the ciphertext C. The decryption context D is prepended to this value, and the resulting octet string is returned as the output of the AEAD-KT encryption operation.

The encryption process can be illustrated as follows.

Let the AEAD-KT key be denoted as K.

Let the AEAD-KT nonce be denoted as N.

Let the AEAD-KT plaintext be denoted as P.

AEAD-KT associated data=A||D. Thus the associated data is produced by a concatenation of the AEAD associated data A and the decryption context D.

AEAD-KT ciphertext=D||C. Thus the AEAD-KT ciphertext is the concatenation of the decryption context D and the AEAD ciphertext.

In the foregoing description, a concatenation of two octet strings A and B is denoted as A||B.

3.4.1.2 Decryption

The authenticated decryption operation has four inputs: K, N, and A, as defined above, and the Ciphertext C. A single output is provided, either a plaintext value P or a failure signal that indicates that the inputs are not authentic.

The AEAD-KT decryption process receives three inputs: N, A, and C as defined above. (The AEAD key K is computed from the decryption context.)

The AEAD-KT decryption process operates as follows in an embodiment:

1. The initial D_LEN octets are stripped from C, and are used as the decryption context D. D_LEN is a fixed parameter of the AEAD process. The remaining octets of C are used as the ciphertext.

2. The decryption context D is appended to the associated data A.

3. The decryption context D is decrypted, using an independent process, and the resulting plaintext is used as the AEAD key K. (The key-decryption process is described below.)

4. The AEAD decryption process is run using the key derived from the decryption context. The AEAD-KT nonce N and associated data A are used as the AEAD nonce and associated data. The ciphertext is as derived in Step 1.

5. If the AEAD process returns a failure signal (which indicates that the plaintext is not authentic), then the AEAD-KT process returns a failure signal. Otherwise, the plaintext value returned by the AEAD process is returned by the AEAD-KT process.

Alternately, the decryption operation receives the AEAD key K as input, in which case the decrypter can strip out the decryption context, but can otherwise ignore it. This alternative is useful if there are multiple decryption engines processing the same encrypted message, one or more of which do not have the key encrypting key.

3.4.2 Decryption Context: Example Embodiments

In one embodiment, the decryption context contains a four-octet Key Index (KI) field. This field indicates the key-encrypting-key that was used to encrypt the AEAD key. A receiver can use this field to select the appropriate key for processing a decryption context, from a set of alternatives. The KI field is carried in the first four octets of the decryption context. In the following, key-encryption methods are defined that are suitable for use in a decryption context. These methods are used in the AEAD-KT processes that are defined below.

3.4.2.1 Advanced Encryption Standard 128 Bit Electronic Codebook (AES_128_ECB)

In one embodiment, the Advanced Encryption Standard (AES) can be used in Electronic Codebook (ECB) mode to encrypt a 16 octet key. When this cipher is used, the AES-ECB ciphertext resulting from the encryption of the AEAD key K with the key-encrypting-key forms the final 16 octets of the decryption context. When AES-ECB is used with a 128 bit encryption key, the resulting key-encryption method is termed AES_128_ECB.

3.4.2.2 Advanced Encryption Standard 256 Bit Key Wrap (AES_256_KW)

In another embodiment, the Advanced Encryption Standard (AES) can be used in Key Wrap (KW) mode to encrypt a 32 octet key. When this mode is used, the AES-KW ciphertext resulting from the encryption of the AEAD key K with the key-encrypting-key forms the final 40 octets of the decryption context. When AES-KW is used with a 256 bit encryption key, the resulting key-encryption method is termed AES_256_KW.

3.4.3 Key Management

In an embodiment, the key encrypting key (KEK) is generated and distributed in a manner that is independent of, and orthogonal to, the management of the AEAD keys. For example, the AEAD key could be established by the Internet Key Exchange (IKE), while the KEK could be distributed to a set of devices via an independent secure protocol. The Decryption Context can only be computed by a device that knows both the AEAD key and the KEK.

3.4.3.1 Changing Key Encrypting Keys

In an embodiment, each Key Encrypting Key persists for at least as long as the duration of an AEAD session. However, KEKs may be changed. In one embodiment, the system can set an old KEK as expired, and can also introduce a new KEK. In an embodiment, at least two KEKs are always in use, and a period is defined in which each key is used for encryption, followed by a period in which that key is no longer used for encryption, but can be used for decryption. In the context of AEAD-KT, a KEK is used for encryption whenever a decryption context is generated, and a KEK is used for decryption during the AEAD-KT decryption process.

3.4.3.2 Internet Key Exchange (IKE)

In an embodiment, the DC is carried out in IKE and IKEv2. The DC is conveyed as an octet string to be used by the processor receiving the secret communication. The DC is to be associated with an Encapsulating Security Payload (ESP) SA (Security Association), and is to be used only with that SA.

3.4.3.3 Group Domain of Interpretation (GDOI)

In an embodiment, the DC is carried out in Group Domain of Interpretation (GDOI). The DC is conveyed as an octet string to be used by the processor receiving the secret communication. The DC is to be associated with an Encapsulating Security Payload (ESP) Security Association (SA), and is to be used only with that SA.

3.4.3.4 Transport Layer Security (TLS)

In an embodiment, the DC is carried out in the Transport Layer Security (TLS) handshake. The DC is conveyed as an octet string to be used by the processor receiving the secret communication.

3.4.4 AEAD-KT Processes

This section defines two AEAD-KT processes, according to embodiments, based on Advanced Encryption Standard Galois/Counter Mode (AES-GCM), with key sizes of 128 and 256 bits.

3.4.4.1 Authenticated Encryption with Associated Data and Key Transport under Authenticated Encryption Standard 128 Bit Galois/Counter Mode (AEAD_KT_AES_128_GCM)

One process uses AEAD_AES_128_GCM, and uses AES_128_ECB as its key-encrypting method. D_LEN is 20 octets. The input and output lengths, security considerations, and nonce reuse considerations are as with AEAD_AES_128_GCM, with the following differences:

A_MAX is $2^{61}-21$ octets;

C_MAX is $2^{36}+5$ octets; and an AEAD_KT_AES_128_GCM ciphertext is 36 octets longer than its corresponding plaintext in an embodiment.

3.4.4.2 Authenticated Encryption with Associated Data and Key Transport under Authenticated Encryption Standard 256 Bit Galois/Counter Mode (AEAD_KT_AES_256_GCM)

Another has the following differences in comparison to the AEAD_KT_AES_128_GCM described in the prior section:

AES_256_KW is used as the key encryption method, instead of AES_128_ECB, K_LEN is 32 octets, instead of 16 octets, AES-256 GCM is used instead of AES-128 GCM; and an AEAD_KT_AES_256_GCM ciphertext is exactly 60 octets longer than its corresponding plaintext.

3.4.5 Using AEAD-KT in Encapsulating Security Payload (ESP)

An AEAD process can be used in the Encapsulating Security Payload (ESP). The use of an AEAD process to convey the DC is consistent with the ESP design; the Payload Data field in that protocol has a structure that depends on the choice of encryption process and mode. Any AEAD process can be used in ESP.

3.4.6 Using AEAD-KT in Transport Layer Security (TLS)

The Transport Layer Security (TLS) protocol, version 1.2, described in IETF RFC 5246, defines how an AEAD process can be used in that protocol. AEAD-KT also can be used in TLS in the same manner as AEAD.

3.4.7 Design Options

This section outlines several alternative formats for the DC.

In one embodiment, a DC contains multiple ciphertexts, each containing the AEAD key encrypted under a distinct key encrypting key (KEK). In this case, each ciphertext is preceded by a distinct security parameters index (SPI) value, so that the correspondence between ciphertexts and KEKs is clear to the receivers. This embodiment is useful when there are multiple receivers that do not share KEKs.

In some cases it may be desirable to allow the DC to be generated in such a way as to select the recipients from a set of possible recipients, in a flexible way. One embodiment of the DC contains a more complex structure that would allow a set of selected recipients to decrypt the key. The Logical Key Hierarchy (LKH) group key management protocol defines a message that encrypts a key so that only a subset of a current group can decrypt it. Similarly, the Subset-Difference key management method defines a way to encrypt a key so that only a subset of possible recipients can decrypt it. Key management information from methods like these may be incorporated into the DC, in some embodiments, if it is necessary to have this flexibility.

3.4.8 Security Considerations

The integrity and authenticity of the DC is protected by the AEAD-KT process, in the manner provided by the AEAD process on which AEAD-KT is based. If the DC is modified by an attacker, then the AEAD decryption process will return a fail indication, assuming that the attacker cannot forge messages against the AEAD process. Like all AEAD processes, AEAD-KT provides the security services of confidentiality and authenticity, but it does not provide anti-replay protection. In one embodiment, where this security service is required, it is provided by an external mechanism.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
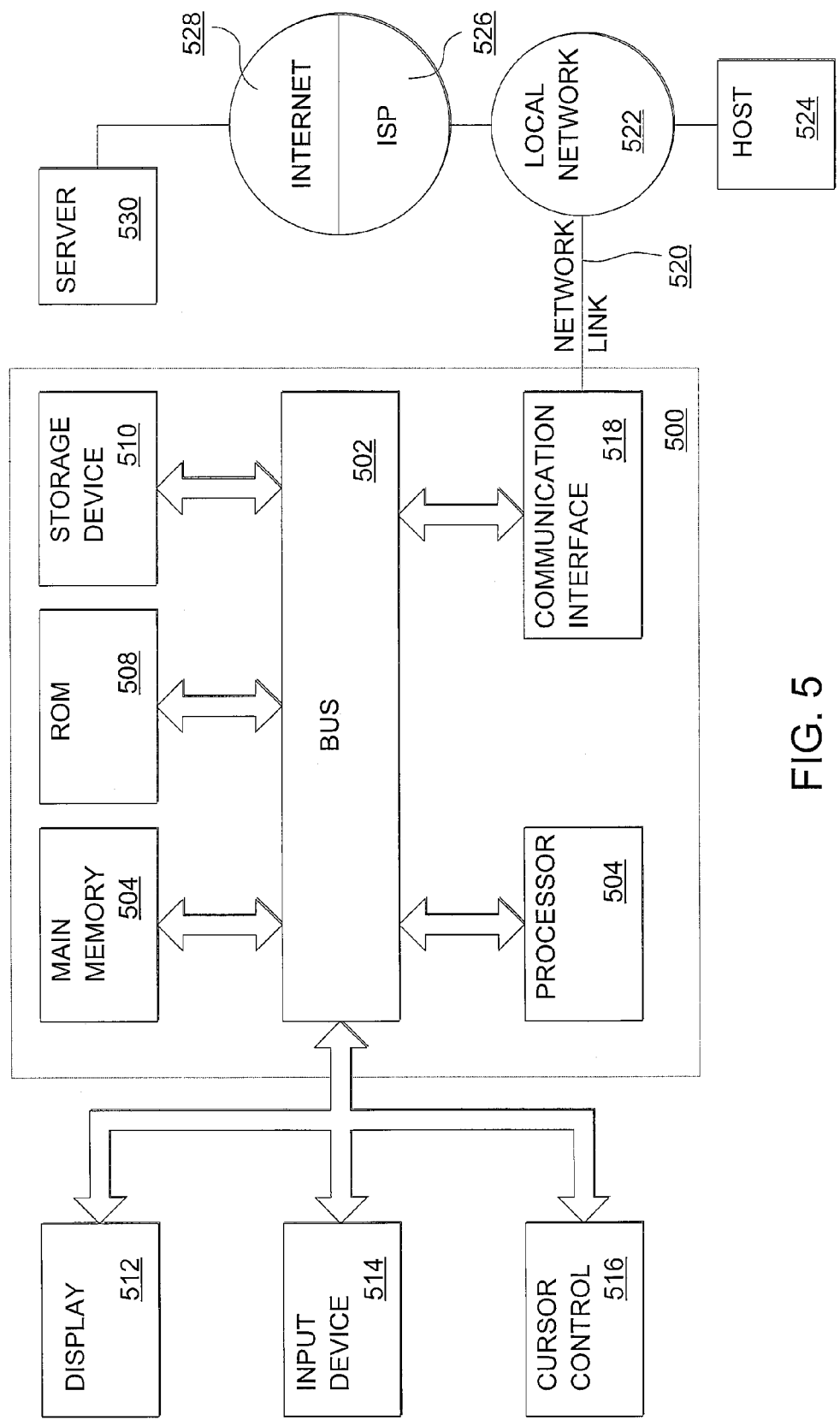
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
  selecting a plaintext message to be authenticated and encrypted using an Authenticated Encryption with Associated Data (AEAD) process;
  selecting an associated data to be authenticated and transmitted, but not encrypted;
  selecting a key encrypting key;
  creating and storing a data key to encrypt the plaintext message in a uniformly random or pseudorandom manner;
  creating and storing a ciphertext message, wherein the ciphertext message is at least as long as the plaintext message and is derived by encrypting using at least the plaintext message and the data key;
  creating and storing an encrypted data key, wherein the encrypted data key is derived from at least the data key and a key encrypting key;
  generating a communication, comprising at least the associated data in an Associated Data (AD) element, and a concatenation of the encrypted data key and the ciphertext message, wherein the encrypted data key is in a decryption context (DC) element separate from the AD element;
sending the communication to a receiver;
wherein each of the above steps is performed by one or more processors.

2. The method of claim 1, further comprising:
parsing the communication into at least the encrypted data key and the ciphertext message;
regenerating the data key, wherein the data key is a function of at least the encrypted data key, and the key encrypting key;
performing an authentication test on the encrypted data key, and the key encrypting key;
determining that the data key is authentic only when all of the encrypted data key, and the key encrypting key are authentic according to the authentication test;
generating and communicating a failure indication when at least one of the encrypted data key and the key encrypting key is not authentic according to the authentication test;
regenerating the plaintext message, wherein the plaintext message is a function of at least the ciphertext message, and the data key, wherein the plaintext message comprises a failure indication if at least one of the ciphertext message and the data key is not authentic according to the authentication test;
wherein each of the above steps is performed by one or more processors.

3. The method of claim 1, wherein the communication comprises a data packet comprising an internet protocol header, an encapsulating security payload header, an initialization vector, the DC element, an encrypted region comprising the ciphertext message, and an integrity check value.

4. The method of claim 3, wherein the DC element comprises the encrypted data key and instructions regarding how a decryptor can decrypt and process the encrypted data key.

5. The method of claim 4, wherein the instructions comprise key management information received from a Logical Key Hierarchy (LKH) group key management protocol or a Subset-Difference key management method.

6. The method of claim 1, wherein the encrypted data key is derived using any of AES-CCM (Advanced Encryption Standard, Counter with Cipher Block Chaining Message Authentication Code), AES-CBC and AES-GCM (Galois/ Counter Mode).

7. The method of claim 3, wherein an Internet Protocol security (IPsec) Encapsulating Security Payload (ESP) Transform describes the (DC) element in a ciphertext field, following an initialization vector (IV) and optionally a sequence number and preceding the ciphertext, and wherein the IV and the DC are in an ESP Payload Data field.

8. The method of claim 1, further comprising creating the key encrypting key using any of Electronic Codebook (ECB) encryption of Advanced Encryption Standard 128-bit (AES-128) keys, and AES in Key Wrap mode with a 256-bit encryption key.

9. The method of claim 1, further comprising distributing the key encrypting key to a plurality of group members using Group Domain of Interpretation (GDOI).

10. The method of claim 1, performed as part of a transport layer security (TLS) protocol, or as part of secure real time protocol (RTP), or as part of secure shell (SSH) communications.

11. The method of claim 3, performed as part of Internet Key Exchange (IKE) or as part of Group Domain of Interpretation (GDOI) and in which the DC element is conveyed as an octet string to be associated with a Encapsulating Security Payload (ESP) Security Association (SA).

12. The method of claim 1, further comprising setting the key encrypting key as expired, continuing to use the key encrypting key for decryption but not for encryption, and initiating using a new key encrypting key for both decryption and encryption.

13. An apparatus, comprising:
a data storage medium storing: a key encrypting key; a plaintext message to be authenticated, encrypted using an Authenticated Encryption with Associated Data (AEAD) process, and transmitted; an associated data to be authenticated and transmitted, but not encrypted;
logic configured to generate: a data key in a uniformly random or pseudorandom manner; a nonce that is either unique for any particular value of the data key or zero-length; a ciphertext message, wherein the ciphertext message is at least as long as the plaintext message and is determined by encrypting using at least the plaintext message, the data key and the nonce; an encrypted data key, wherein the encrypted data key is derived from at least the data key and the key encrypting key;
logic configured to generate a communication comprising at least the associated data in an Associated Data (AD) element, and a concatenation of the encrypted data key, the ciphertext message, wherein the encrypted data key is in a decryption context (DC) element separate from the AD element.

14. The apparatus of claim 13, further comprising:
logic configured to parse the communication into at least the encrypted data key, the ciphertext message and the associated data, and to reconstruct or receive the nonce;
logic configured to regenerate the data key, wherein the data key is a function of at least the encrypted data key and the key encrypting key, and to regenerate the authentic data key if all of the encrypted data key, the key encrypting key, and the nonce are authentic and to generate a failure indication if at least one of the encrypted data key, the key encrypting key, and the nonce is not authentic;
logic configured to regenerate the plaintext message, wherein the plaintext message is a function of at least the ciphertext message, the data key, and the nonce, and to regenerate the authentic plaintext message if all of the ciphertext message, the data key, and the nonce are authentic and to generate a failure indication if at least one of the ciphertext message, the data key, and the nonce is not authentic.

15. The apparatus of claim 13, wherein a first device contains logic configured to generate the data key and to encrypt the data, and a second device comprises a data storage medium storing the key encrypting key and is configured to generate the DC element associated to the data key and to return the DC element to the first device.

16. The apparatus of claim 13, wherein the communication comprises a data packet comprising an internet protocol header, an encapsulating security payload header, an initialization vector, context the DC element, an encrypted region comprising the ciphertext message, and an integrity check value.

17. The apparatus of claim 16, wherein the DC element comprises the encrypted data key and instructions regarding how a decryptor can decrypt and process the encrypted data key.

18. The apparatus of claim 17, wherein the instructions comprise key management information received from a Logical Key Hierarchy (LKH) group key management protocol or a Subset-Difference key management method.

19. The apparatus of claim 13, further comprising logic configured to derive the encrypted data key using any of AES-CCM (Advanced Encryption Standard, Counter with Cipher Block Chaining Message Authentication Code), AES-CBC and AES-GCM (Galois/Counter Mode).

20. The apparatus of claim 16, wherein an Internet Protocol security (IPsec) Encapsulating Security Payload (ESP) Transform describes the (DC) element in a ciphertext field, following an initialization vector (IV) and optionally a sequence number and preceding the ciphertext, and wherein the IV and the DC are in an ESP Payload Data field.

21. The apparatus of claim 13, further comprising logic configured to create the key encrypting key using any of Electronic Codebook (ECB) encryption of Advanced Encryption Standard 128-bit (AES-128) keys, and AES in Key Wrap mode with a 256-bit encryption key.

22. The apparatus of claim 13, further comprising logic configured to distribute the key encrypting key to a plurality of group members using Group Domain of Interpretation (GDOI).

23. The apparatus of claim 13, further comprising logic configured to operate the apparatus as part of a transport layer security (TLS) protocol, or as part of secure real time protocol (RTP), or as part of secure shell (SSH) communications.

24. The apparatus of claim 16, further comprising logic configured to operate the apparatus as part of Internet Key Exchange (IKE) or as part of Group Domain of Interpretation (GDOI) and in which the DC element is conveyed as an octet string to be associated with a single Encapsulating Security Payload (ESP) Security Association (SA).

25. The apparatus of claim 13, further comprising logic configured to cause setting the key encrypting key as expired, continuing to use the key encrypting key for decryption but not for encryption, and initiating using a new key encrypting key for both decryption and encryption.

26. A non-transitory computer-readable storage medium storing one or more sequences of instructions which, when executed by one or more processors, cause performing:
  selecting a plaintext message to be authenticated, encrypted using an Authenticated Encryption with Associated Data (AEAD) process and transmitted;
  selecting an associated data to be authenticated and transmitted, but not encrypted;
  selecting a key encrypting key;
  creating and storing a data key to encrypt the plaintext message in a uniformly random or pseudorandom manner;
  creating and storing a ciphertext message, wherein the ciphertext message is at least as long as the plaintext message and is derived by encrypting using at least the plaintext message and the data key;
  creating and storing an encrypted data key, wherein the encrypted data key is derived from at least the data key and a key encrypting key;
  generating a communication comprising at least the associated data in an Associated Data (AD) element, and a concatenation of the encrypted data key, the ciphertext message, wherein the encrypted data key is in a decryption context (DC) element separate from the AD element;
  wherein each of the above steps is performed by one or more processors.

27. The non-transitory computer-readable storage medium of claim 26, further comprising instructions which when executed cause:
  parsing the communication into at least the encrypted data key, the ciphertext message, and the associated data;
  regenerating the data key, wherein the data key is a function of at least the encrypted data key, and the key encrypting key;
  performing an authentication test on the encrypted data key and the key encrypting key;
  determining that the data key is authentic only when all of the encrypted data key and the key encrypting key are authentic according to the authentication test;
  generating and communicating a failure indication when at least one of the encrypted data key and the key encrypting key is not authentic according to the authentication test;
  regenerating a plaintext message, wherein the plaintext message is a function of at least the ciphertext message and the data key, wherein the plaintext message comprises a failure indication if at least one of the ciphertext message and the data key is not authentic according to the authentication test.

28. The non-transitory computer-readable data storage medium of claim 26, wherein the communication comprises a data packet comprising an internet protocol header, an encapsulating security payload header, an initialization vector, context the DC element, an encrypted region, and an integrity check value.

29. The non-transitory computer-readable data storage medium of claim 28, wherein the DC element comprises the encrypted data key and instructions regarding how a decryptor can decrypt and process the encrypted data key.

30. The non-transitory computer-readable medium of claim 29, wherein the instructions comprise key management information received from a Logical Key Hierarchy (LKH) group key management protocol or a Subset-Difference key management method.

* * * * *